(12) United States Patent
Jonsson et al.

(10) Patent No.: US 7,474,648 B2
(45) Date of Patent: Jan. 6, 2009

(54) FILTERING MULTIPATH PROPAGATION DELAY VALUES FOR USE IN A MOBILE COMMUNICATIONS SYSTEM

(75) Inventors: Elias Jonsson, Malmö (SE); Hiroaki Watabe, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 763 days.

(21) Appl. No.: 10/679,439

(22) Filed: Oct. 7, 2003

(65) Prior Publication Data

US 2004/0259576 A1 Dec. 23, 2004

Related U.S. Application Data

(60) Provisional application No. 60/479,151, filed on Jun. 18, 2003.

(51) Int. Cl.
 *H04B 7/216* (2006.01)
(52) U.S. Cl. .............. 370/342; 370/350; 455/67.16
(58) Field of Classification Search .............. 370/350, 370/328, 335, 342; 455/434, 502, 67.16
See application file for complete search history.

(56) References Cited

U.S. PATENT DOCUMENTS

| 6,480,558 | B1* | 11/2002 | Ottosson et al. ............. 375/350 |
| 6,510,143 | B1 | 1/2003 | Bejjani et al. |
| 6,519,276 | B1 | 2/2003 | Kim et al. |
| 7,012,909 | B2* | 3/2006 | Tanno et al. ................. 370/335 |
| 2002/0015399 | A1 | 2/2002 | Hirade |
| 2003/0039304 | A1 | 2/2003 | Terao |
| 2003/0202541 | A1* | 10/2003 | Lim et al. ................... 370/503 |

FOREIGN PATENT DOCUMENTS

| EP | 0989685 A2 | 3/2000 |
| JP | 2002198864 A | 7/2002 |
| WO | WO00/21201 | 4/2000 |
| WO | 00/55992 | 9/2000 |
| WO | 01/45295 A | 6/2001 |
| WO | 02/29996 A2 | 4/2002 |
| WO | 02/082676 A1 | 10/2002 |

OTHER PUBLICATIONS

European Search Report, completed Jun. 28, 2007, in connection with European Application No. 06 077 230.8.

* cited by examiner

*Primary Examiner*—Nguyen Vo
(74) *Attorney, Agent, or Firm*—Potomac Patent Group PLLC (57) ABSTRACT

A time slot boundary of an unknown cell in a telecommunications system is identified by correlating a received signal with a known code over a range of delay values for each of one or more time slots, wherein the known code is used by all cells in the telecommunications system. Only for each of the delay values that are not associated with a known cell, correlation values obtained at each of the one or more time slots are accumulated. The time slot boundary is identified by determining which of the delay values is associated with a highest accumulated correlation value. One or more stored monitored delay sets may be used to determine which delay values are not associated with a known cell. The one or more stored monitored delay sets may be filtered using delay information obtained over a period of time.

54 Claims, 5 Drawing Sheets

FILTERING MULTIPATH PROPAGATION DELAY VALUES FOR USE IN A MOBILE COMMUNICATIONS SYSTEM

CROSS-REFERENCE TO RELATED APPLICATIONS

This application claims the benefit of U.S. Provisional Application No. 60/479,151, filed Jun. 18, 2003, which is hereby incorporated herein by reference in its entirety.

BACKGROUND

The present invention relates to communication systems, and more particularly to the processing of multipath propagation delay information for use in mobile communication systems.

Modern telecommunications systems, such as cellular telecommunications systems, rely on digital technology for the representation and transmission of information, such as audio information. Any of a number of modulation techniques is used to impose the digital information onto a radio frequency signal, which is then transmitted from a sender's antenna, and which is received by a receiver's antenna. Ideally, the receiver would merely perform a reverse of the modulation process to recover the digital information from the received signal.

In practice, however, the transmitted signal is often distorted by the channel (i.e., the air interface) between the transmitter's antenna and the receiver's antenna. For example, a main ray of a transmitted signal may take a direct route between the transmitting and receiving antennas, but other rays may take indirect routes, such as reflecting off of various objects (e.g., buildings, mountains) in the environment prior to being received by the receiver's antenna. This effect is often called "multipath propagation" of the signal. These indirect paths can take longer for the signal to traverse than the direct path. Consequently, signals representing the same information emanating from the same source may arrive at the receiver at different times. The various paths between the transmitter and the receiver subject the signal to varying amounts of attenuation, so they are not all received at the same signal strength. Nonetheless, they are typically received at sufficiently high power levels to cause an effect wherein, at any moment, a received signal includes a present signal (representing a present piece of desired information) plus one or more delayed components from previously transmitted signals (each representing an earlier piece of information). This type of signal distortion is often called Inter-Symbol Interference (ISI).

To counteract ISI, a receiver typically employs an equalizer, which demodulates the signal in a way that utilizes a model of the channel (also referred to as an "estimate" of the channel). The channel estimate is typically generated from another component in the receiver, called a channel estimator. A channel estimator relies on a received signal including a portion, often called a "training sequence", that contains a predefined sequence of 1's and 0's known to have been transmitted by the transmitter. By comparing an actually received training sequence portion of a signal with an expected training sequence, the channel estimator is able to construct a model of the channel that can be used by the equalizer when it attempts to demodulate a portion of the received signal that includes unknown information.

While one might consider ISI to be a detrimental affect of multipath propagation, the phenomenon of multipath propagation may itself be applied to the benefit of a communications system, such as to combat fading in a Code Division Multiple Access (CDMA) system. CDMA is a channel access technique that allows signals to overlap in both time and frequency. CDMA is a type of spread spectrum communication technique, which has been around since the days of World War II. Early applications were predominantly military-oriented. However, today there has been an increasing interest in using spread spectrum systems in commercial applications because spread spectrum communications provide robustness against interference, and allow for multiple signals to occupy the same radio band at the same time. Examples of such commercial applications include digital cellular radio, land mobile radio, and indoor and outdoor personal communication networks.

In a CDMA system, each signal is transmitted using any of a number of spread spectrum techniques. In one such variation of CDMA, called "Direct Sequence CDMA" (DS-CDMA) (e.g., Wideband-CDMA—"WCDMA"), the informational data stream to be transmitted is impressed upon a much higher rate data stream known as a signature sequence. This permits the same broadband frequency channel to be re-used in every adjacent cell. Typically, the signature sequence data are binary, thereby providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

A plurality of spread information signals modulate a radio frequency carrier, for example by binary phase shift keying (BPSK), and are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and de-spread. If quadrature phase shift keying (QPSK) modulation is used, then the signature sequence may consist of complex numbers (having real and imaginary parts), where the real and imaginary parts are used to modulate respective ones of two carriers at the same frequency, but ninety degrees out of phase with respect to one another.

Traditionally, a signature sequence is used to represent one bit of information. Receiving the transmitted sequence or its complement indicates whether the information bit is a +1 or −1, sometimes denoted "0" or "1". The signature sequence usually comprises N bits, and each bit of the signature sequence is called a "chip". The entire N-chip sequence, or its complement, is referred to as a transmitted symbol. The conventional receiver, such as a RAKE receiver, correlates the received signal with the complex conjugate of the known signature sequence to produce a correlation value. Only the real part of the correlation value is computed. When a large positive correlation results, a "0" is detected; when a large negative correlation results, a "1" is detected.

In order to optimally detect the transmitted signal, the strongest rays of the multipath propagated signal must be combined in an appropriate way. This is usually done by the RAKE receiver, which is so named because it "rakes" different paths together. A RAKE receiver uses a form of diversity combining to collect the signal energy from the various received signal paths (or rays). The term "diversity" refers to the fact that a RAKE receiver uses redundant communication channels so that when some channels fade, communication is still possible over non-fading channels. A CDMA RAKE receiver combats fading by detecting the echo signals individually, and then adding them together coherently.

In order to collect the different rays, the RAKE receiver comprises a number of so-called "fingers", each configured to receive the information from a differently delayed version of the received signal. The receiver can use a searcher to determine those delays associated with the strongest signal energy. Briefly, a searcher operates by correlating differently delayed versions of a chip sequence known to be present in the received signal against the received signal. The delays associated with the highest correlation values are then stored as the "delay profile" of this channel. It is important that the RAKE receiver configure each of its fingers to use a corresponding one of the strongest taps (paths). If the receiver does not use the strongest taps, the receiver will ask for more power and thereby increase the interference experienced by the other receivers. The overall interference is minimized when each of the receivers uses the least amount of power possible. It will be apparent, then, that in a receiver such as a RAKE receiver, it is important for the delay profile to reflect, as much as possible, present conditions of the receiver. However, as the receiver moves from place to place, the delay profile will change in correspondence with the changed terrain over which the signal has propagated. Thus, it is desired to provide improved methods and apparatuses for maintaining an accurate delay profile.

The phenomenon of multipath propagation can also be advantageously applied in the mobile communication device's quest to identify new cells in its vicinity. When moving with a mobile communication device in a mobile communications system, the device constantly needs to look for new cells, with potentially better transmission conditions. This process is called the cell search. For example, in accordance with the present standard for WCDMA mobile telephone systems, the device keeps track of 21 cells simultaneously, of which 9 are intra-frequency cells and two other frequencies (inter-frequency) containing at most 6 cells each. As the device moves around, this list of monitored cells needs to be updated to reflect present conditions.

At a high level, the cell search can be viewed as a process whereby the device processes a received signal to determine its source. More particularly, the cell search comprises three phases, as illustrated in the flow diagram of FIG. 1. In the first phase (phase 1), the slot boundary (i.e., time slot boundary) is found; in the second phase (phase 2), the slot boundary is used to find the frame boundary; and in the third phase (phase 3), knowledge of the frame boundary enables the cell's scrambling code to be determined. The scrambling code identifies the cell.

Figure 1:
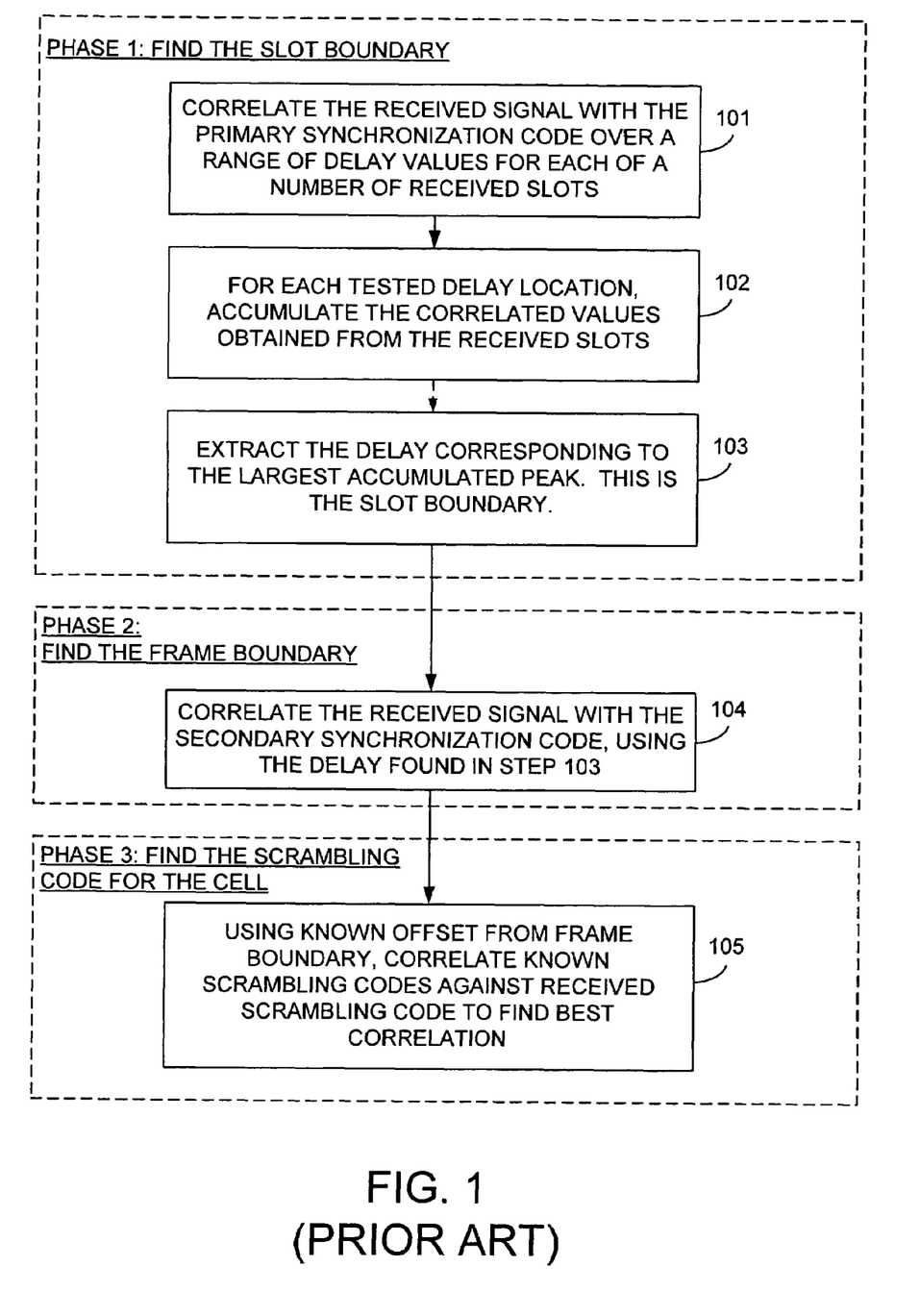
FIG. 1 is a flow diagram depicting steps associated with performing a cell search.

Looking first at phase 1, the search to find the slot boundary is aided by the fact that all cells use the same primary synchronization code. Thus, to find the slot boundary, a known primary synchronization code is correlated against the received signal for a range of delay values that span the duration of a slot (e.g., in WCDMA, over at least 2560 chips) (step 101). This generates a correlation value for each tested delay.

The primary synchronization code appears once in each time slot contained in a transmitted frame. (In WCDMA, each frame includes 15 time slots). In order to improve performance (e.g., to mitigate the effects of a short fade in the signal), this correlation process is repeated for each of a number of successively received time slots. That is, if the duration of a time slot is $T_s$, then for each delay value $T_d$, a correlation is performed at a position $T_{corr}(n)=T_d+nT_s$, where $n=0, \ldots, N_{test\_slots}-1$ and $N_{test\_slots}$ is the number of slots to be tested. For example, in a WCDMA system, one might perform the at least 2560 test correlations for each of the 15 slots known to be present in a frame.

For each tested delay value, the resultant correlation values are then accumulated (step 102). The maximum accumulated value is then taken as the slot boundary for a cell (step 103).

Knowledge of the slot boundary does not, by itself, inform the device of what the frame boundary is, because as mentioned earlier, each frame includes more than one slot. Turning now to phase 2, the frame boundary may be found by using the just-determined slot boundary in conjunction with a set of known secondary synchronization codes. In systems such as WCDMA, each frame includes a secondary synchronization code positioned at a known location within the frame. While the particular secondary synchronization code for the cell being "searched" is not known to the device doing the testing, the set of predefined secondary synchronization codes is. Thus, the device may hypothesize that each of the, for example, 15 slot boundaries is the start of the frame, and for each of these hypothesized frame boundaries, determine where the secondary synchronization code should be. For each of the hypothesized secondary synchronization code locations, each of the secondary synchronization codes known to be in use in the communication system is correlated against the received signal. This generates, for each hypothesized secondary synchronization code location, a correlation value. The highest correlation value from among all of the performed correlations is taken as an indicator of the secondary synchronization code location (step 104). Since the secondary synchronization code location is defined to have a predefined offset from the frame boundary, the frame boundary may be easily determined. Knowledge of which hypothesized secondary synchronization code is associated with the highest correlation value also informs the device what the secondary synchronization code is for the cell being "searched".

Further in accordance with communication system standards such as those set forth for WCDMA, each secondary synchronization code is, itself, associated with a particular set of scrambling codes. The scrambling code is located once in each frame at a known offset from the frame boundary. Thus, in phase 3 of the cell search process, the scrambling code for the cell is found by correlating each of the scrambling codes associated with the known secondary synchronization code against the received signal at the known offset from the frame boundary. The highest correlating scrambling code is then taken to be the scrambling code for this "searched" cell (step 105).

As is readily apparent from the above, there is quite a bit of processing involved in discovering a cell. However, in this process there is nothing to prevent the slot boundary of an already known cell from being detected when it is necessary to identify multiple cells within the same carrier frequency (a common occurrence in CDMA systems). Thus, it is desired to provide cell search methods and apparatuses that avoid unnecessary processing steps.

It is therefore an object of the present invention to provide methods and apparatuses that address one or more of the above-described problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods, apparatuses and computer-readable storage media for identifying a time slot boundary of an unknown cell in a telecommunications system. In one aspect, this is accomplished by correlating a received signal with a known code over a range of delay values for each of one or more time slots, wherein the known code is used by all cells in the telecommunications system. Correlation values obtained at each of the one or more time slots are accumulated only for each of the delay values that are not associated with a known cell. The time slot boundary is identified by determining which of the delay values is associated with a highest accumulated correlation value.

In another aspect of the invention, the time slot boundary may be used to identify a frame boundary. In yet another aspect of the invention, the frame boundary may be used to identify the unknown cell.

One or more stored monitored delay sets may be used to determine which delay values are not associated with a known cell.

In another aspect of the invention, the one or more stored monitored delay sets are filtered using delay information obtained over a period of time. In some embodiments, the filtering is a non-linear filtering that does not utilize information about the size of multipath powers.

In yet another aspect of the invention, filtering the one or more stored monitored delay sets using delay information obtained over the period of time may comprise, for each delay value in an existing one of the monitored delay sets, adjusting a corresponding quality indicator to indicate a lower quality if the delay value is not also represented in a newly obtained set of delay values. For each delay value in the existing one of the monitored delay sets, the corresponding quality indicator is adjusted to indicate a higher quality if the delay value is also represented in the newly obtained set of delay values. For each of the quality indicators, if the quality indicator is less than a first threshold value, then the corresponding delay value is removed from the existing one of the monitored delay sets.

In still another aspect, filtering the one or more stored monitored delay sets using delay information obtained over the period of time may comprise adding one or more newly-found delays to the existing one of the monitored delay sets.

It should be noted that the above-described filtering techniques are also useful in contexts other than identifying a time slot boundary of an unknown cell.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

Figure 2:
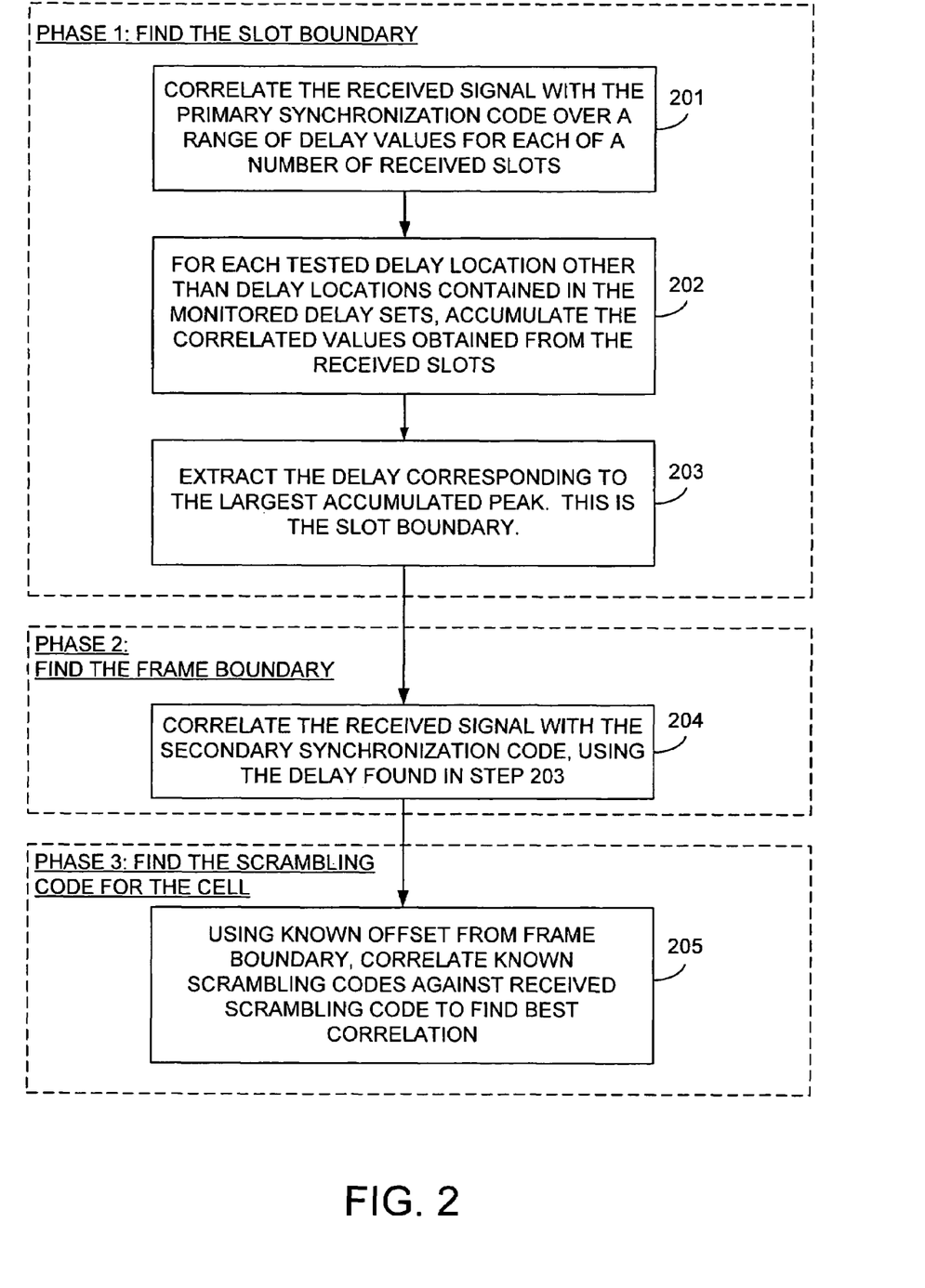
FIG. 2 is a flow diagram of a process for efficiently performing a cell search in accordance with an aspect of the invention.

FIG. 2 is a flow diagram of a process for efficiently performing a cell search in accordance with an aspect of the invention. As mentioned earlier, a problem with conventional cell search techniques is that they are likely to expend a great deal of processing effort only to discover a cell that is already known to the device. The technique described herein avoids this by eliminating accumulation of correlation values at the delay locations of already known cells. This is referred to herein as "masking" out known cells. Referring now to FIG. 2, it can be seen that, at a high level, the technique involves the same three-phase process as is used in convention techniques: finding the slot boundary (phase 1), finding the frame boundary (phase 2) and finding the scrambling code for the cell (phase 3). The technique differs from the conventional techniques, however, in that the "searched" cell that is identified in phase 3 is substantially guaranteed not to be a cell that the device already knows about.

Looking at the technique in greater detail, the steps associated with phases 2 and 3 (i.e., steps 204 and 205) are the same as the counterpart steps 104 and 105 that were described in connection with FIG. 1. Thus, these steps need not be described here in detail.

Looking at phase 1, in an exemplary embodiment the first step of correlating the received signal with the primary synchronization code over a range of delay values for each of a number of received slots is the same as the counterpart step 101 described above in connection with FIG. 1. In step 202, however, accumulation of correlation values obtained in step 201 is performed only for those delay locations that are not associated with an already-monitored (i.e., known) cell. (For each already-monitored cell, its associated set of delays—i.e., the delays that make up its delay profile—may be referred to herein as the "monitored delay set".) It will be observed that information about delay locations associated with each of the already-monitored cells is stored within the device, so this information is readily available to the device.

It will be recognized that, in practice, a delay location associated with any particular cell is highly unlikely to also be associated with another adjacent cell. Therefore, by not performing accumulation of correlation values associated with an already-monitored cell, only known cells will be filtered out of the cell search process. Thus, two benefits are achieved: the device does not perform the entire three-phase process only to "discover" an already-known cell, and just about all of the processing associated with delay locations of already-monitored cells is avoided, thereby making the cell search process more efficient.

While the technique described above is generally useful for more efficiently performing the cell search, it may nonetheless generate erroneous results under some circumstances. This is due to the fact that, in practice, the path-searcher is run quite infrequently, for example, once every ten frames. Simply using the delays from the last path-search is consequently not sufficient for masking out the known cells because of the nature of a fading propagation channel. For example, the last path-search might have missed a multi-path delay because it was in a fading dip. Thus, the missed multi-path delay location is not stored in the device in connection with the delay profile for this known cell. When a next cell search is run at some later point in time, the fading dip may no longer exist, resulting in detection of the slot boundary given by this earlier-missed multipath delay. As a result, an already existing cell may be detected in phase 3.

In accordance with one aspect of the invention, this problem is addressed by applying filtering to the set of multipath delay locations associated with each monitored (i.e., already-known) cell. The goal of the filtering is to use knowledge obtained from the path searcher over a period of time to maintain a more-accurate set of multipath delay locations that make up the delay profile of a monitored cell. The filtered set of known multipath delay locations is then used in step 202 (see FIG. 2) to determine whether a particular delay location is contained in the monitored delay set.

One possibility for such filtering is to filter the power values associated with the delays. (The multi-path delays and their power values for a known cell are given by a path-searcher.) The level of filtering in such embodiments must be selected carefully. If hard filtering is chosen in an attempt to combat fading, a multi-path delay location will be kept in the set for a long time after it has disappeared. The stronger the path was before disappearing, the longer it will linger in memory. If, on the other hand, hard filtering is not used, then the technique ends up with noisy power values that could be subject to the severe fading variations. The use of a lower threshold, below which a path is declared gone, could be used. However, to strike a trade-off between the correct amount of filtering, and a proper lower threshold quickly becomes complicated.

In accordance with yet another aspect of the invention, a non-linear filtering of the multipath delays may be used to help maintain a more accurate set of multipath delay locations in the delay profile for each monitored cell (i.e., to help maintain a more accurate set of monitored delays). The non-linear filtering technique makes the size of the multipath powers irrelevant. In addition to solving the masking out of known cells efficiently, it is also of low complexity.

The non-linear filtering technique will now be described in detail. The notation and system modeling used in this description are as follows:

For each cell, a maximum of $N_{delays}$ delay values are modeled (e.g., stored) with corresponding quality indicators. The delays in the monitored set for a given cell i are denoted as $d_{i,j}^{(mon)}$ and the corresponding quality indicator as $q_{i,j}^{(mon)}$ for $j=1,\ldots,\hat{N}_{delays}$. In practice, $\hat{N}_{delays}$ is approximately equal to, but usually less than $N_{delays}$, the reason being to avoid allocating unnecessary memory space. The set of delays for cell i is denoted as $d_i^{(mon)}$. Candidate multi-path delays together with their instantaneous power values and an estimate of the power of the noise are supplied by, for example, a path-searcher.

Figure 3:
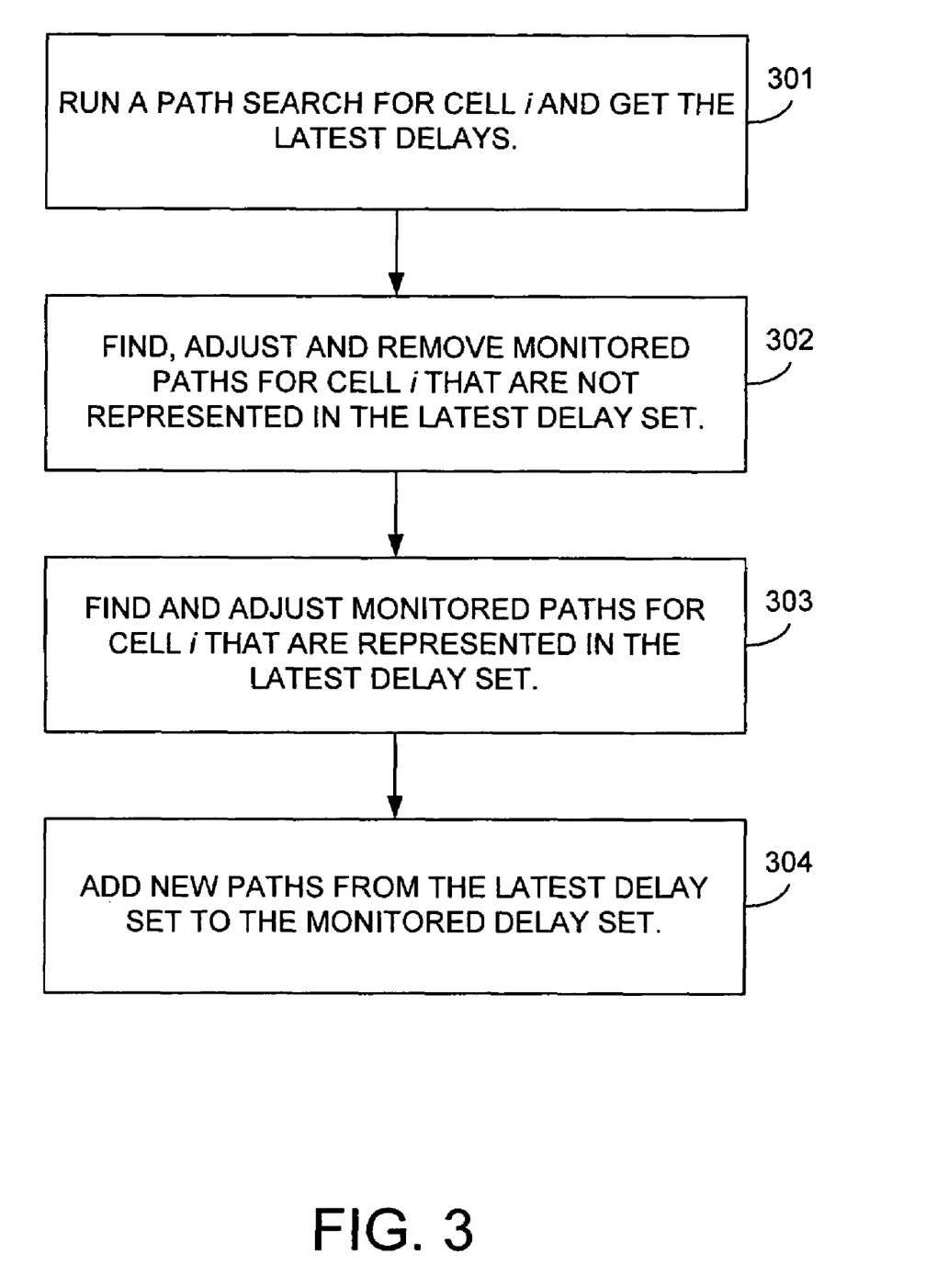
FIG. 3 is a block diagram of a flow diagram of a non-linear delay profile filtering technique in accordance with an aspect of the invention.

The technique for performing the non-linear filtering will now be described with reference to the flow diagram depicted in FIG. 3. The technique begins by running the path searcher on the channel of a known cell to obtain a set of delays $d_{i,j}$, $j=1,\ldots,N_{PS}$ and their corresponding power values (step 301). Here, $N_{PS}$ is the number of delays provided by the path-searcher.

Next, in step 302, all delays in the existing set $d_i^{(mon)}$ that are not represented in the new set $d_{i,j}$, $j=1,\ldots,N_{PS}$ are identified. For these delays, the corresponding quality indicators are adjusted as $$q_{i,j}^{(mon)}=q_{i,j}^{(mon)}-c_1,$$

where $c_1$ is a predefined constant. If the resultant value of $q_{i,j}^{(mon)}$ is less than zero, the corresponding delay is removed from the monitored set. The basis for this aspect of the filtering is that if a known delay was not presently detected by the path searcher, it may be due to a momentary fade, or alternatively it may be due to a permanent change in the delay profile for the monitored cell. Thus, the constant $c_1$ should be set to gradually reduce the quality indicator $q_{i,j}^{(mon)}$ over time. If the particular delay continues to not be detected by the path searcher over time, the value of $q_{i,j}^{(mon)}$ will gradually be reduced until it eventually becomes a negative value, at which point the corresponding delay is removed from the monitored set.

Next, in step 303, all delays in the existing set $d_i^{(mon)}$ that are also represented in the new set $d_{i,j}$, $j=1,\ldots,N_{PS}$ are identified. For these delays the corresponding quality indicators are adjusted in accordance with:

$$q_{i,j}^{(mon)}=q_{i,j}^{(mon)}+c_2,$$

where $c_2$ is a predefined constant. This portion of the non-linear filtering is responsive to the fact that if a known delay continues to be detected, it is more likely to continue to exist until the next path search of this cell. It is preferred that the value of $q_{i,j}^{(mon)}$ not be permitted to grow without bound. In order to avoid this, if $q_{i,j}^{(mon)}$ is greater than a predefined maximum value, $\tau_{high}$, then $q_{i,j}^{(mon)}$ is set equal to the maximum value, $\tau_{high}$.

Next, in step 304, a new set of delays is defined as the set of all delays that are included in the new set $d_{i,j}$, $j=1,\ldots,N_{PS}$, but which are not represented in the existing set $d_i^{(mon)}$. Such delays are referred to herein as newly-found delays. It will be recalled that, in a typical system, the number $\hat{N}_{delays}$ of delays that are maintained in the delay profile for a monitored cell is approximately equal to, but usually less than the maximum number of delays, $N_{delays}$, that can be stored in the buffer. (As used herein, the word "buffer" refers to the physical storage space for accommodating the set $d_i^{(mon)}$.) Thus, any remaining space that exists in the set $d_i^{(mon)}$ is then filled with members selected from the newly-found delays in the new set of delays, with precedence being given to those newly-found delays in the new set of delays having large power values.

There is usually space in the set $d_i^{(mon)}$ to accommodate the members selected from the newly-found delays in the new set of delays. However, in some circumstances this may not be the case. For example, in "birth-death" (i.e., urban) conditions, the delay positions of suddenly-lost paths (e.g., when moving around a corner of a building) might be lingering in the delay memory. Furthermore, the exemplary slot boundary finding techniques (Phase 1) illustrated in FIGS. 1 and 2 assume for the sake of example that the slot boundary is found at a chip resolution. Under these conditions, two delay positions may be used up just to mask out one path. Moreover, if the cell searcher is alternatively implemented to perform at a sub-chip resolution, then it is more often the case that the memory space in the set $d_i^{(mon)}$ can be filled up.

Thus, any of the following situations are possible:

The buffer may already have enough space to accommodate all of the newly-found delays. In this case, all of the newly-found delays may be stored in the buffer.

Alternatively, it may be the case that the buffer has enough space to accommodate some, but not all of the newly-found delays. In this case, it may be adequate to merely put as many of the newly-found delays into the buffer as will fit. Alternatively, strategies can be invoked to remove some number of "old" delay values in order to make even more room in the buffer to accommodate some or all of the newly-found delays.

It may further be the case that the buffer is completely full at the outset, so that none of the newly-found delays can be stored in the buffer without taking further action. In such cases, it is preferable that at least some room be made in the buffer so that at least the "best" of the newly-found delays can be stored in the the buffer.

Figure 4A:
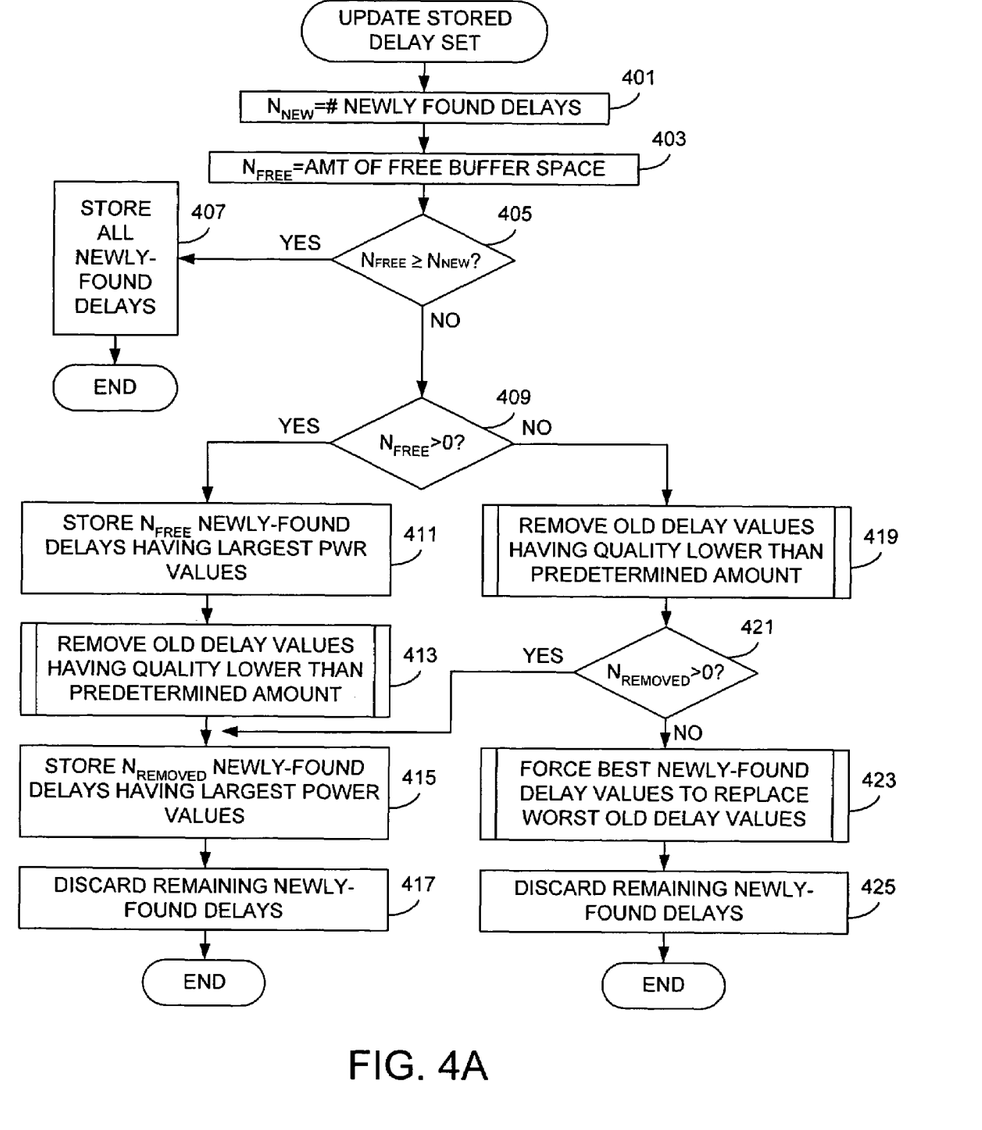
FIGS. 4A, 4B and 4C are a flow diagram of an exemplary technique for determining which of a set of newly-found delays are to be stored in an existing buffer of delays, and how to make room in the existing buffer if necessary.
Figure 4B:
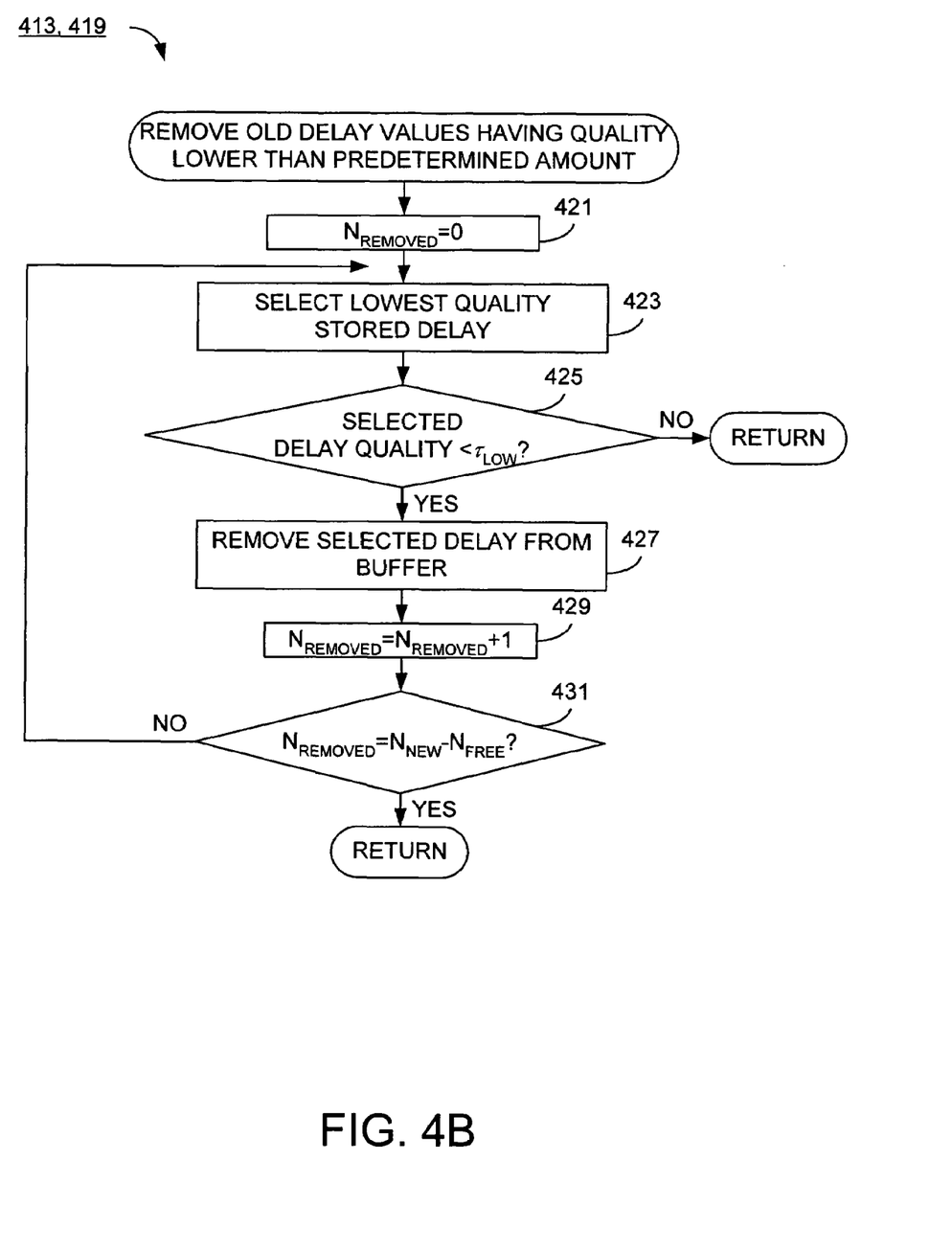
Figure 4C:
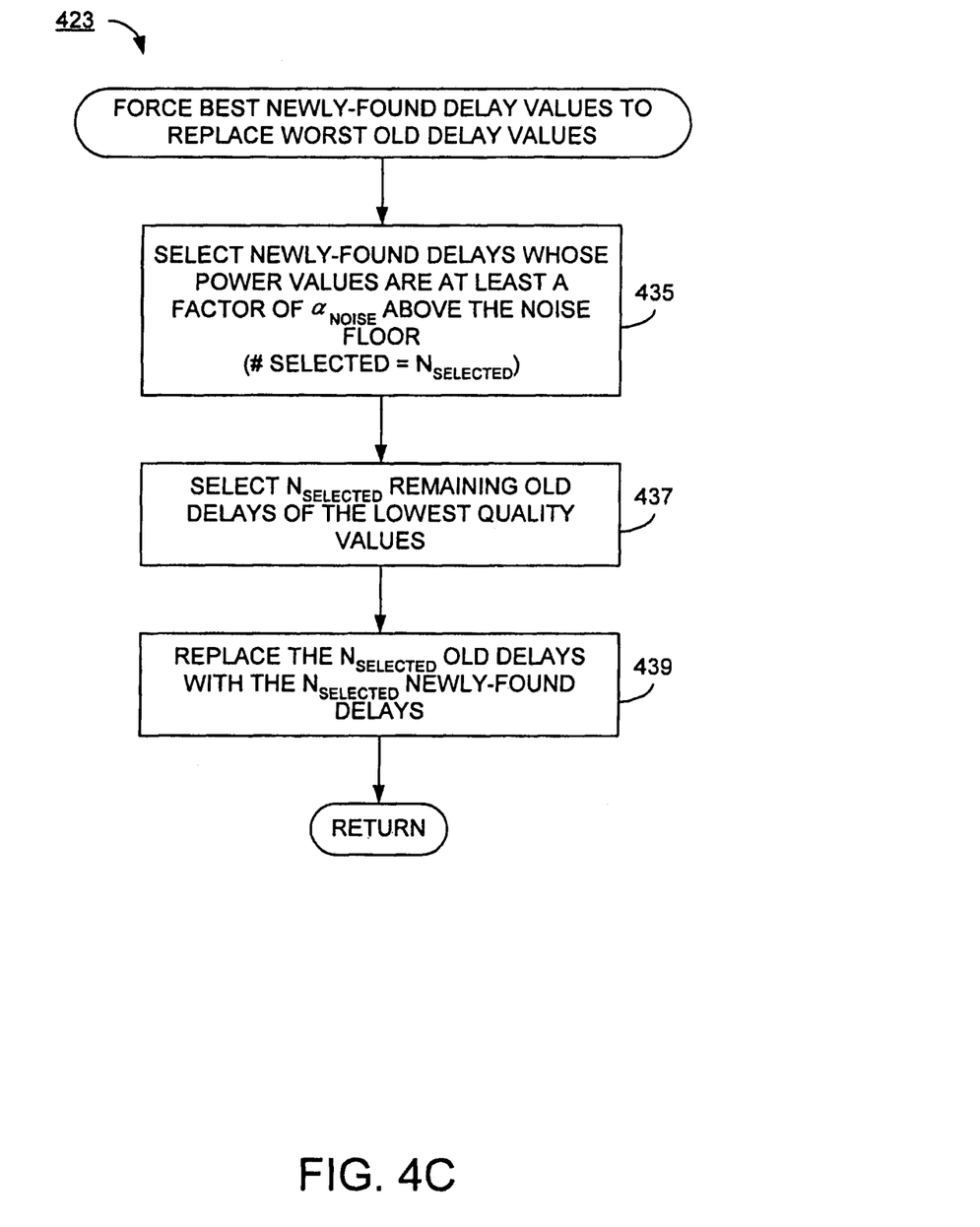

FIGS. 4A, 4B and 4C are a flow diagram for automatically (e.g., by means of a processor executing a set of program instructions) determining which of a set of newly-found delays are to be stored in an existing buffer of delays, and for making room in the existing buffer if necessary to accommodate at least some of the newly-found delays.

The number of newly-found delays ($N_{NEW}$) is found (step 401), as is the amount of already-existing free buffer space ($N_{FREE}$) (step 403). If the amount of already-existing free buffer space is greater than or equal to the number of newly-found delays ("YES" branch out of decision block 405), then all of the newly-found delays are stored into the buffer (step 407), and the process is complete.

Alternatively, if the amount of already-existing free buffer space is less than the number of newly-found delays ("NO" branch out of decision block 405), then a test on the amount of existing free space in the buffer ($N_{FREE}$) is performed in order to determine whether there is presently any space available at all. If it is determined that there is at least some free space in the buffer ("YES" branch out of decision block 409), then the $N_{FREE}$ newly-found delays having the largest power values are stored into the buffer (step 411), thereby making it full. These stored newly-found delays will no longer be considered among the set of newly-found delays.

Next, an attempt is made to make more room in the buffer by examining the "old" delay values that had previously been saved in the buffer, and removing those that are associated with a quality indicator value $q_{i,j}^{(mon)}$ that is lower than a predetermined threshold, $\tau_{LOW}$ (step 413). Assume that the number removed by this process is $N_{REMOVED}$. Then, $N_{REMOVED}$ newly-found delays having the largest power values from among all of the newly-found delays are stored into the buffer (i.e., into the space just made available) (step 415). The remaining newly-found delay values are then discarded (step 417). The motivation for doing this is that, since at least one newly-found delay has been stored into the buffer (i.e., because $N_{FREE}$ was greater than zero), the remaining "old" delay values may be given the benefit of the doubt that they are still valid. In this regard, it will be observed that the newly-found delays are noisy estimates of potential delay values, and should not be fully trusted.

Returning now to a consideration of decision block 409, if it is determined that the buffer is initially full (i.e., that there is initially no free space) ("NO" path out of decision block 409), then it is even more important to try to find a way of making room in the buffer to store at least some of the newly-found delays. Thus, an attempt is first made to make more room in the buffer by examining the "old" delay values that had previously been saved in the buffer, and removing those that are associated with a quality indicator value $q_{i,j}^{(mon)}$ that is lower than a predetermined threshold, $\tau_{LOW}$ (step 419). Again assume that the number removed by this process is $N_{REMOVED}$. The values $N_{REMOVED}$ is then tested to determine whether this removal attempt was successful (decision block 421). If at least one "old" delay was removed from the buffer, then processing continues at step 415, and proceeds as described above. That is, $N_{REMOVED}$ newly-found delays having the largest power values from among all of the newly-found delays are stored into the buffer (i.e., into the space just made available) (step 415). The remaining newly-found delay values are then discarded (step 417).

Returning to a consideration of decision block 421, if none of the "old" delays were removed from the buffer in step 419 ("NO" path out of decision block 421), then another attempt is made to make room in the buffer by "forcing" the best newly-found delay values to replace the "worst" old delay values, so long as the best newly-found delay values pass some threshold test for quality (step 423). (If none of the newly-found delay values pass such a test, then none of the "old" delay values would be replaced.) Following this, the remaining ones of the newly-found delay values may be discarded (step 425).

Several techniques for removing "old" delay values from the buffer have been discussed. Exemplary embodiments of these techniques will now be described. Referring first to FIG. 4B, this illustrates a process (invoked in steps 413 and 419) for removing "old" delay values having a quality lower than a predetermined amount. In the exemplary embodiment, this is achieved by initializing a variable representing the number of "old" values removed from the buffer ($N_{REMOVED}$) to zero (step 421). Then, the set of "old" delay values is examined, and the one associated with the lowest quality indicator value $q_{i,j}^{(mon)}$ is selected (step 423). If this lowest-quality delay value has a quality indicator value $q_{i,j}^{(mon)}$ lower than a threshold amount (represented by $\tau_{LOW}$) ("YES" path out of decision block 425), then the selected delay value is removed from the buffer (step 427). The value of $N_{REMOVED}$ is then adjusted to show that a delay value has been removed from the buffer (step 429). Next, a test is performed to determine whether it is necessary to remove any more "old" values from the buffer (decision block 431). In particular, the total number of newly-found delay values is $N_{NEW}$, and $N_{FREE}$ of these have already been stored in the buffer. Thus, it is unnecessary to remove more than $N_{NEW}$-$N_{FREE}$. If the number of removed values, $N_{REMOVED}$ has not yet reached the value of $N_{NEW}$-$N_{FREE}$, then process branches back to continue at step 423, which was described above.

There are thus two ways to exit this process. One way occurs when the number of removed values, $N_{REMOVED}$ has reached the value of $N_{NEW}$-$N_{FREE}$ ("YES" path out of decision block 431). When this path is taken, it will be possible to store all of the newly-found delay values into the buffer.

An alternative way of exiting the loop occurs when it is no longer possible to find an "old" delay value having an associated quality indicator value $q_{i,j}^{(mon)}$ lower than the threshold amount, $\tau_{LOW}$ ("NO" path out of decision block 425). In this case, fewer than all of the newly-found delay values will make their way into the buffer.

Another exemplary technique for removing "old" delay values from the buffer will now be described with reference to FIG. 4C. This technique (which was invoked at step 423) "forces" the best newly-found delay values to replace the worst old delay values. In this exemplary embodiment, those newly-found delay values are selected whose power values are at least a factor of $\alpha_{NOISE}$ above a noise floor (step 435). The number selected is herein represented by the variable $N_{SELECTED}$. To make room for this number of newly-found delay values in the buffer, $N_{SELECTED}$ "old" delay values associated with the lowest quality indicator values are selected (step 427). These selected "old" delay values are removed from the buffer, and replaced by the selected newly-found delay values (step 439).

In the above-described embodiments, when it was found that the buffer had some free space available but not enough to accommodate all of the newly-found delay values, (e.g., "YES" path out of decision block 409), space was made by removing old delay values having a quality lower than a predetermined amount. After storing some number of newly-found delay values into this newly-created space in the buffer, the remaining newly-found delays were discarded (step 417) on the assumption that the "old" delay values should be given the benefit of the doubt. In alternative embodiments, however, after storing the newly-found delays having largest power values into the newly-created space (e.g., step 415), a further attempt to create additional space in the buffer can be made. This further attempt can follow the strategy illustrated in FIG. 4C, that is, "forcing" best ones of the remaining newly-found delay values to replace "worst" ones of the previously-existing set of "old" delay values.

In the above description, a number of predefined constants were referred to. Of course, suitable values for these constants can vary widely from system to system. In a WCDMA system, suitable values for these constants, as well as recommended values are set forth in the following table:

| Parameter | Range of values | Recommended value |
|---|---|---|
| $N_{delays}$ | 6 to 15 | 8 |
| $c_1$ | 1 to 2 | 1 |
| $c_2$ | 3 to 4 | 3 |
| $\tau_{low}$ | 0 to 3 | 2 |
| $\tau_{high}$ | 8 to 20 | 10 |
| $\alpha_{noise}$ | 1 to 4 | 3 |

The above-described non-linear filtering of the multipath delay profiles is useful for maintaining a suitable delay profile for configuring a RAKE receiver, as well as for providing improved performance of the above-described cell masking technique used in the cell search process. With this non-linear filtering technique, the magnitude of the various multipath signal powers is irrelevant. Moreover, the non-linear filtering strategy is practical to embody in a portable device because it is of low complexity.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of identifying a time slot boundary of an unknown cell in a telecommunications system, the method comprising:

correlating a received signal with a known code over a range of delay values for each of one or more time slots, wherein the known code is used by all cells in the telecommunications system;

only for each of the delay values that are not associated with a known cell, accumulating correlation values obtained at each of the one or more time slots; and identifying the time slot boundary by determining which of the delay values is associated with a highest accumulated correlation value.

2. The method of claim 1, further comprising:
using the time slot boundary to identify a frame boundary.

3. The method of claim 2, further comprising:
using the frame boundary to identify the unknown cell.

4. The method of claim 1, comprising:
using one or more stored monitored delay sets to determine which delay values are not associated with a known cell.

5. The method of claim 4, comprising:
filtering the one or more stored monitored delay sets using delay information obtained over a period of time.

6. The method of claim 5, wherein the filtering is a non-linear filtering that does not utilize information about the size of multipath powers.

7. The method of claim 5, wherein filtering the one or more stored monitored delay sets using delay information obtained over the period of time comprises:

for each delay value in an existing one of the monitored delay sets, adjusting a corresponding quality indicator to indicate a lower quality if the delay value is not also represented in a newly obtained set of delay values;

for each delay value in the existing one of the monitored delay sets, adjusting the corresponding quality indicator to indicate a higher quality if the delay value is also represented in the newly obtained set of delay values; and for each of the quality indicators, if the quality indicator is less than a first threshold value, then removing the corresponding delay value from the existing one of the monitored delay sets.

8. The method of claim 7, wherein filtering the one or more stored monitored delay sets using delay information obtained over the period of time comprises:

adding one or more newly-found delays to the existing one of the monitored delay sets.

9. The method of claim 7, wherein:
adjusting a corresponding quality indicator to indicate a lower quality is in accordance with $$q_{i,j}^{(mon)} = q_{i,j}^{(mon)} - c_1,$$

where:

$q_{i,j}^{(mon)}$ is a $j^{th}$ quality indicator corresponding to cell i in the telecommunications system;

$i = 1, \ldots, N_{cells}$;

$N_{cells}$ is a total number of cells in the telecommunications system;

$j = 1, \ldots, \hat{N}_{delays}$;

$\hat{N}_{delays}$ is a total number of delay values in the existing one of the monitored delay sets; and $c_1$ is a first predefined constant; and adjusting the corresponding quality indicator to indicate a higher quality is in accordance with:

$$q_{i,j}^{(mon)} = q_{i,j}^{(mon)} + c_2,$$

where $c_2$ is a second predefined constant.

10. The method of claim 9, wherein:
the first threshold is zero;
$c_1$ is in a range 1 to 2, inclusive; and
$c_2$ is in a range 3 to 4, inclusive.

11. The method of claim 10, wherein adjusting the corresponding quality indicator to indicate a higher quality further comprises limiting how large $q_{i,j}^{(mon)}$ is permitted to become such that if $q_{i,j}^{(mon)} > \tau_{high}$, then $q_{i,j}^{(mon)}$ is set equal to $\tau_{high}$.

12. The method of claim 7, wherein adjusting the corresponding quality indicator to indicate a higher quality comprises preventing the corresponding quality indicator from exceeding a predefined maximum value.

13. The method of claim 7, further comprising:
generating a set of newly-found delays; and
determining that there is not enough space in an existing one of one or more monitored delay sets to additionally store all delays in the set of newly-found delays, and in response thereto replacing one or more delay values in the existing one of the monitored delay sets with a corresponding number of delay values in the set of newly-found delays.

14. The method of claim 13, comprising:
in response to determining that there is not enough space in an existing one of one or more monitored delay sets to additionally store all delays in the set of newly-found delays, then making space in the existing one of one or more monitored delay sets by removing from the existing one of the monitored delay sets those delay values having a corresponding quality indicator lower than a predetermined amount.

15. The method of claim 13, comprising:
in response to determining that there is not enough space in an existing one of one or more monitored delay sets to additionally store all delays in the set of newly-found delays, then causing best newly-found delay values to replace worst old delay values.

16. The method of claim 15, wherein the best newly-found delay values are those having power values that are above a noise floor level by a factor of a predetermined amount.

17. A method of filtering a monitored delay set in a telecommunications system, the method comprising:
for each delay value in the monitored delay set, adjusting a corresponding quality indicator to indicate a lower quality if the delay value is not also represented in a newly obtained set of delay values;
for each delay value in the monitored delay set, adjusting the corresponding quality indicator to indicate a higher quality if the delay value is also represented in the newly obtained set of delay values; and
for each of the quality indicators, if the quality indicator is less than a first threshold value, then removing the corresponding delay value from the monitored delay set.

18. The method of claim 17, comprising:
adding one or more newly-found delays to the existing one of the monitored delay sets.

19. The method of claim 17, wherein:
adjusting a corresponding quality indicator to indicate a lower quality is in accordance with $$q_{i,j}^{(mon)} = q_{i,j}^{(mon)} - c_1,$$

where:
$q_{i,j}^{(mon)}$ is a $j^{th}$ quality indicator corresponding to cell i in the telecommunications system;
$i = 1, \ldots, N_{cells}$;
$N_{cells}$ is a total number of cells in the telecommunications system;
$j = 1, \ldots, \hat{N}_{delays}$;
$\hat{N}_{delays}$ is a total number of delay values in the existing one of the monitored delay sets; and
$c_1$ is a first predefined constant; and
adjusting the corresponding quality indicator to indicate a higher quality is in accordance with:

$$q_{i,j}^{(mon)} = q_{i,j}^{(mon)} + c_2,$$

where $c_2$ is a second predefined constant.

20. The method of claim 19, wherein:
the first threshold is zero;
$c_1$ is in a range 1 to 2, inclusive; and
$c_2$ is in a range 3 to 4, inclusive.

21. The method of claim 20, wherein adjusting the corresponding quality indicator to indicate a higher quality further comprises limiting how large $q_{i,j}^{(mon)}$ is permitted to become such that if $q_{i,j}^{(mon)} > \tau_{high}$, then $q_{i,j}^{(mon)}$ is set equal to $\tau_{high}$.

22. The method of claim 17, wherein adjusting the corresponding quality indicator to indicate a higher quality comprises preventing the corresponding quality indicator from exceeding a predefined maximum value.

23. The method of claim 17, further comprising:
generating a set of newly-found delays; and
determining that there is not enough space in an existing one of one or more monitored delay sets to additionally store all delays in the set of newly-found delays, and in response thereto replacing one or more delay values in the existing one of the monitored delay sets with a corresponding number of delay values in the set of newly-found delays.

24. The method of claim 23, comprising:
in response to determining that there is not enough space in an existing one of one or more monitored delay sets to additionally store all delays in the set of newly-found delays, then making space in the existing one of one or more monitored delay sets by removing from the existing one of the monitored delay sets those delay values having a corresponding quality indicator lower than a predetermined amount.

25. The method of claim 23, comprising:
in response to determining that there is not enough space in an existing one of one or more monitored delay sets to additionally store all delays in the set of newly-found delays, then causing best newly-found delay values to replace worst old delay values.

26. The method of claim 25, wherein the best newly-found delay values are those having power values that are above a noise floor level by a factor of a predetermined amount.

27. An apparatus for identifying a time slot boundary of an unknown cell in a telecommunications system, the apparatus comprising:
logic that correlates a received signal with a known code over a range of delay values for each of one or more time slots, wherein the known code is used by all cells in the telecommunications system;
logic that accumulates correlation values obtained at each of the one or more time slots, only for each of the delay values that are not associated with a known cell; and
logic that identifies the time slot boundary by determining which of the delay values is associated with a highest accumulated correlation value.

28. The apparatus of claim 27, further comprising:
logic that uses the time slot boundary to identify a frame boundary.

29. The apparatus of claim 28, further comprising:
logic that uses the frame boundary to identify the unknown cell.

30. The apparatus of claim 27, comprising:
logic that uses one or more stored monitored delay sets to determine which delay values are not associated with a known cell.

31. The apparatus of claim 30, comprising:
logic that filters the one or more stored monitored delay sets using delay information obtained over a period of time.

32. The apparatus of claim 31, wherein the logic that filters performs a non-linear filtering without utilizing information about the size of multipath powers.

33. The apparatus of claim 31, wherein the logic that filters the one or more stored monitored delay sets using delay information obtained over the period of time comprises:
logic that, for each delay value in an existing one of the monitored delay sets, adjusts a corresponding quality indicator to indicate a lower quality if the delay value is not also represented in a newly obtained set of delay values;
logic that, for each delay value in the existing one of the monitored delay sets, adjusts the corresponding quality indicator to indicate a higher quality if the delay value is also represented in the newly obtained set of delay values; and
logic that, for each of the quality indicators, removes the corresponding delay value from the existing one of the monitored delay sets if the quality indicator is less than a first threshold value.

34. The apparatus of claim 33, wherein the logic that filters the one or more stored monitored delay sets using delay information obtained over the period of time comprises:
logic that adds one or more newly-found delays to the existing one of the monitored delay sets.

35. The apparatus of claim 33, wherein:
the logic that adjusts a corresponding quality indicator to indicate a lower quality operates in accordance with $$q_{i,j}^{(mon)} = q_{i,j}^{(mon)} - c_1,$$

where:
$q_{i,j}^{(mon)}$ is a $j^{th}$ quality indicator corresponding to cell i in the telecommunications system;
$i=1, \ldots, N_{cells}$;
$N_{cells}$ is a total number of cells in the telecommunications system;
$j=1, \ldots, \hat{N}_{delays}$;
$\hat{N}_{delays}$ is a total number of delay values in the existing one of the monitored delay sets; and
$c_1$ is a first predefined constant; and
the logic that adjusts the corresponding quality indicator to indicate a higher quality operates in accordance with:

$$q_{i,j}^{(mon)} = q_{i,j}^{(mon)} + c_2,$$

where $c_2$ is a second predefined constant.

36. The apparatus of claim 35, wherein:
the first threshold is zero;
$c_1$ is in a range 1 to 2, inclusive; and
$c_2$ is in a range 3 to 4, inclusive.

37. The apparatus of claim 36, wherein the logic that adjusts the corresponding quality indicator to indicate a higher quality further comprises logic that limits how large $q_{i,j}^{(mon)}$ is permitted to become such that if $q_{i,j}^{(mon)} > \tau_{high}$, then $q_{i,j}^{(mon)}$ is set equal to $\tau_{high}$.

38. The apparatus of claim 33, wherein the logic that adjusts the corresponding quality indicator to indicate a higher quality comprises logic that prevents the corresponding quality indicator from exceeding a predefined maximum value.

39. The apparatus claim 33, further comprising:
logic that generates a set of newly-found delays; and
logic that determines that there is not enough space in an existing one of one or more monitored delay sets to additionally store all delays in the set of newly-found delays, and in response thereto replaces one or more delay values in the existing one of the monitored delay sets with a corresponding number of delay values in the set of newly-found delays.

40. The apparatus of claim 39, comprising:
logic that, in response to determining that there is not enough space in an existing one of one or more monitored delay sets to additionally store all delays in the set of newly-found delays, makes space in the existing one of one or more monitored delay sets by removing from the existing one of the monitored delay sets those delay values having a corresponding quality indicator lower than a predetermined amount.

41. The apparatus of claim 39, comprising:
logic that, in response to determining that there is not enough space in an existing one of one or more monitored delay sets to additionally store all delays in the set of newly-found delays, causes best newly-found delay values to replace worst old delay values.

42. The apparatus of claim 41, wherein the best newly-found delay values are those having power values that are above a noise floor level by a factor of a predetermined amount.

43. An apparatus for filtering a monitored delay set in a telecommunications system, the apparatus comprising:
logic that, for each delay value in the monitored delay set, adjusts a corresponding quality indicator to indicate a lower quality if the delay value is not also represented in a newly obtained set of delay values;
logic that, for each delay value in the monitored delay set, adjusts the corresponding quality indicator to indicate a higher quality if the delay value is also represented in the newly obtained set of delay values; and
logic that, for each of the quality indicators, removes the corresponding delay value from the monitored delay set if the quality indicator is less than a first threshold value.

44. The apparatus of claim 43, comprising:
logic that adds one or more newly-found delays to the existing one of the monitored delay sets.

45. The apparatus of claim 43, wherein:
the logic that adjusts a corresponding quality indicator to indicate a lower quality operates in accordance with $$q_{i,j}^{(mon)} = q_{i,j}^{(mon)} - c_1,$$

where:
$q_{i,j}^{(mon)}$ is a $j^{th}$ quality indicator corresponding to cell i in the telecommunications system;
$i=1, \ldots, N_{cells}$;
$N_{cells}$ is a total number of cells in the telecommunications system;
$j=1, \ldots, \hat{N}_{delays}$;
$\hat{N}_{delays}$ is a total number of delay values in the existing one of the monitored delay sets; and
$c_1$ is a first predefined constant; and adjusting the corresponding quality indicator to indicate a higher quality is in accordance with:

$$q_{i,j}^{(mon)} = q_{i,j}^{(mon)} + c_2,$$

where $c_2$ is a second predefined constant.

46. The apparatus of claim 45, wherein:
the first threshold is zero;
$c_1$ is in a range 1 to 2, inclusive; and
$c_2$ is in a range 3 to 4, inclusive.

47. The apparatus of claim 46, wherein the logic that adjusts the corresponding quality indicator to indicate a higher quality further comprises logic that limits how large $q_{i,j}^{(mon)}$ is permitted to become such that if $q_{i,j}^{(mon)} > \tau_{high}$, then $q_{i,j}^{(mon)}$ is set equal to $\tau_{high}$.

48. The apparatus of claim 43, wherein the logic that adjusts the corresponding quality indicator to indicate a higher quality comprises logic that prevents the corresponding quality indicator from exceeding a predefined maximum value.

49. The apparatus claim 43, further comprising:
logic that generates a set of newly-found delays; and
logic that determines that there is not enough space in an existing one of one or more monitored delay sets to additionally store all delays in the set of newly-found delays, and in response thereto replaces one or more delay values in the existing one of the monitored delay sets with a corresponding number of delay values in the set of newly-found delays.

50. The apparatus of claim 49, comprising:
logic that, in response to determining that there is not enough space in an existing one of one or more monitored delay sets to additionally store all delays in the set of newly-found delays, makes space in the existing one of one or more monitored delay sets by removing from the existing one of the monitored delay sets those delay values having a corresponding quality indicator lower than a predetermined amount.

51. The apparatus of claim 49, comprising:
logic that, in response to determining that there is not enough space in an existing one of one or more monitored delay sets to additionally store all delays in the set of newly-found delays, causes best newly-found delay values to replace worst old delay values.

52. The apparatus of claim 51, wherein the best newly-found delay values are those having power values that are above a noise floor level by a factor of a predetermined amount.

53. A computer-readable storage medium having stored therein one or more program instructions for causing a processor to identify a time slot boundary of an unknown cell in a telecommunications system by performing:
correlating a received signal with a known code over a range of delay values for each of one or more time slots, wherein the known code is used by all cells in the telecommunications system;
only for each of the delay values that are not associated with a known cell, accumulating correlation values obtained at each of the one or more time slots; and
identifying the time slot boundary by determining which of the delay values is associated with a highest accumulated correlation value.

54. A computer-readable storage medium having stored therein one or more program instructions for causing a processor to filter a monitored delay set in a telecommunications system by performing:
for each delay value in the monitored delay set, adjusting a corresponding quality indicator to indicate a lower quality if the delay value is not also represented in a newly obtained set of delay values;
for each delay value in the monitored delay set, adjusting the corresponding quality indicator to indicate a higher quality if the delay value is also represented in the newly obtained set of delay values; and
for each of the quality indicators, if the quality indicator is less than a first threshold value, then removing the corresponding delay value from the monitored delay set.

* * * * *

UNITED STATES PATENT AND TRADEMARK OFFICE
CERTIFICATE OF CORRECTION

PATENT NO. : 7,474,648 B2  
APPLICATION NO. : 10/679439  
DATED : January 6, 2009  
INVENTOR(S) : Jonsson et al.

It is certified that error appears in the above-identified patent and that said Letters Patent is hereby corrected as shown below:

Figure 4c is missing in the Issued Patent.

In Column 1, Lines 41-51, delete "different times. ......(ISI)." and insert the same at Line 39, after "receiver at" as a continuation of the paragraph.

In Column 11, Line 13, delete "(step 427)." and insert -- 437 --, therefor.

Signed and Sealed this

Fifteenth Day of June, 2010

David J. Kappos  
*Director of the United States Patent and Trademark Office*

FIG. 4C

UNITED STATES PATENT AND TRADEMARK OFFICE
CERTIFICATE OF CORRECTION

PATENT NO. : 7,474,648 B2  Page 1 of 3
APPLICATION NO. : 10/679439
DATED : January 6, 2009
INVENTOR(S) : Jonsson et al.

It is certified that error appears in the above-identified patent and that said Letters Patent is hereby corrected as shown below:

Delete the title page and substitute therefore the attached title page showing the corrected number of drawing sheets in patent.

Figure 4c is missing in the Issued Patent and should be added as shown on attached page.

In Column 1, Lines 41-51, delete "different times. ......(ISI)." and insert the same at Line 39, after "receiver at" as a continuation of the paragraph.

In Column 11, Line 13, delete "(step 427)." and insert -- 437 --, therefore.

This certificate supersedes the Certificate of Correction issued June 15, 2010.

Signed and Sealed this

Twentieth Day of July, 2010

David J. Kappos
*Director of the United States Patent and Trademark Office*

CERTIFICATE OF CORRECTION (continued)

(12) United States Patent
Jonsson et al.

(10) Patent No.: US 7,474,648 B2
(45) Date of Patent: Jan. 6, 2009

(54) FILTERING MULTIPATH PROPAGATION DELAY VALUES FOR USE IN A MOBILE COMMUNICATIONS SYSTEM

(75) Inventors: Elias Jonsson, Malmö (SE); Hiroaki Watabe, Tokyo (JP)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 763 days.

(21) Appl. No.: 10/679,439

(22) Filed: Oct. 7, 2003

(65) Prior Publication Data

US 2004/0259576 A1 Dec. 23, 2004

Related U.S. Application Data (60) Provisional application No. 60/479,151, filed on Jun. 18, 2003.

(51) Int. Cl.
*H04B 7/216* (2006.01)
(52) U.S. Cl. ............ 370/342; 370/350; 455/67.16
(58) Field of Classification Search ............ 370/350, 370/328, 335, 342; 455/434, 502, 67.16
See application file for complete search history.

(56) References Cited

U.S. PATENT DOCUMENTS

| | | | |
|---|---|---|---|
| 6,480,558 B1 * | 11/2002 | Ottosson et al. | 375/350 |
| 6,510,143 B1 | 1/2003 | Bejjani et al. | |
| 6,519,276 B1 | 2/2003 | Kim et al. | |
| 7,012,909 B2 * | 3/2006 | Tanno et al. | 370/335 |
| 2002/0015399 A1 | 2/2002 | Hirade | |
| 2003/0039304 A1 | 2/2003 | Terao | |
| 2003/0202541 A1 * | 10/2003 | Lim et al. | 370/503 |

FOREIGN PATENT DOCUMENTS

| | | |
|---|---|---|
| EP | 0989685 A2 | 3/2000 |
| JP | 2002198864 A | 7/2002 |
| WO | WO00/21201 | 4/2000 |
| WO | 00/55992 | 9/2000 |
| WO | 01/45295 A | 6/2001 |
| WO | 02/29996 A2 | 4/2002 |
| WO | 02/082676 A1 | 10/2002 |

OTHER PUBLICATIONS

European Search Report, completed Jun. 28, 2007, in connection with European Application No. 06 077 230.8.

* cited by examiner

*Primary Examiner*—Nguyen Vo
(74) *Attorney, Agent, or Firm*—Potomac Patent Group PLLC (57) ABSTRACT

A time slot boundary of an unknown cell in a telecommunications system is identified by correlating a received signal with a known code over a range of delay values for each of one or more time slots, wherein the known code is used by all cells in the telecommunications system. Only for each of the delay values that are not associated with a known cell, correlation values obtained at each of the one or more time slots are accumulated. The time slot boundary is identified by determining which of the delay values is associated with a highest accumulated correlation value. One or more stored monitored delay sets may be used to determine which delay values are not associated with a known cell. The one or more stored monitored delay sets may be filtered using delay information obtained over a period of time.

54 Claims, 6 Drawing Sheets

FIG. 4C